Feb. 11, 1936.   E. W. DAVIS   2,030,504
METHOD OF LUBRICATION AND APPARATUS THEREFOR
Filed Feb. 7, 1934   2 Sheets-Sheet 1
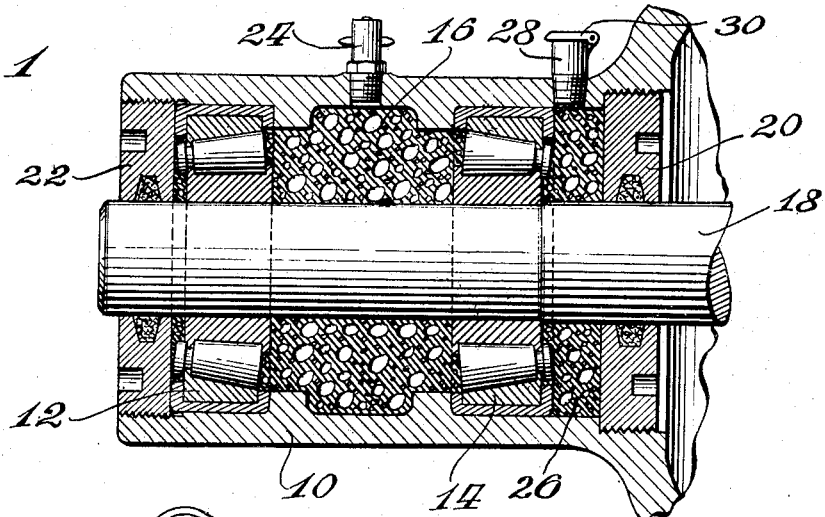
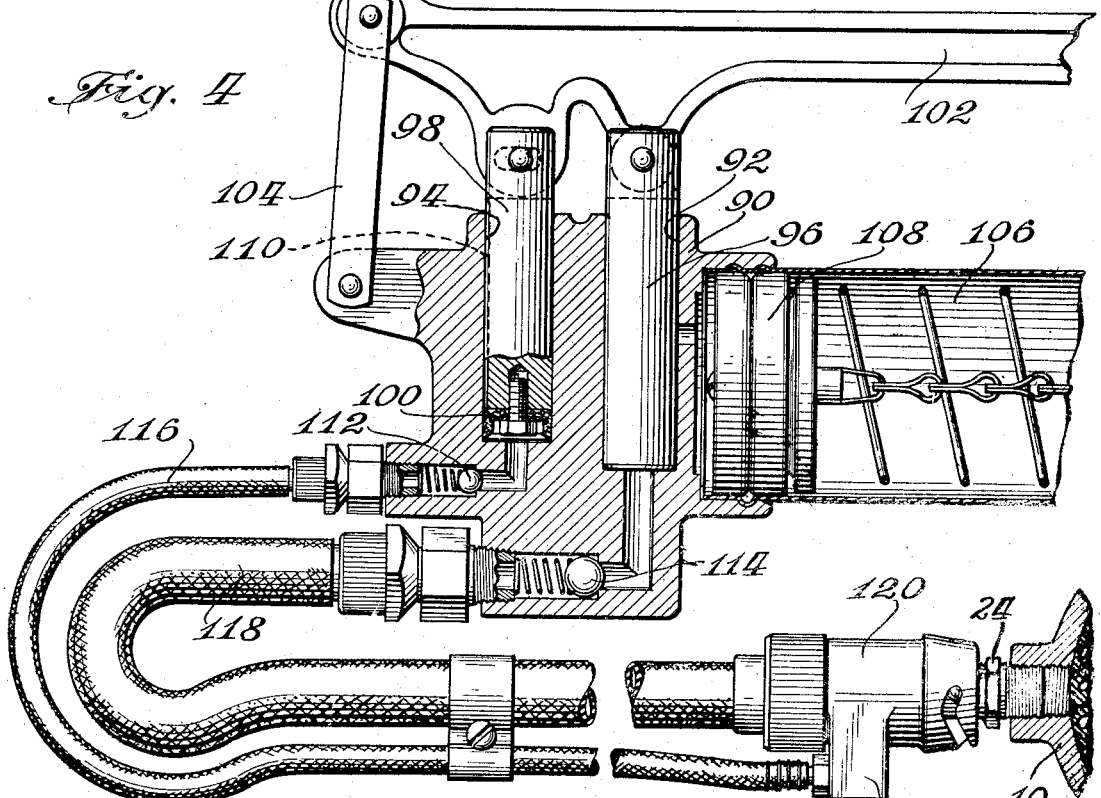
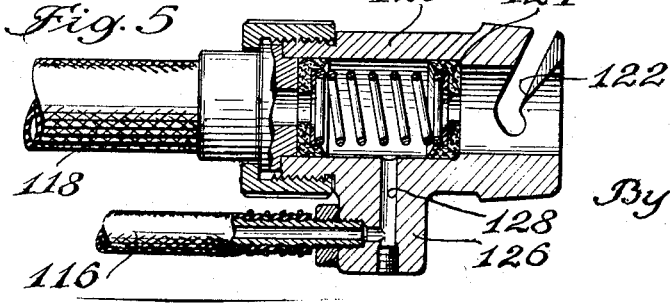
Inventor:
Ernest W. Davis
By Williams, Bradbury,
McCaleb, & Hinkle.
Attys.

Feb. 11, 1936. E. W. DAVIS 2,030,504
METHOD OF LUBRICATION AND APPARATUS THEREFOR
Filed Feb. 7, 1934 2 Sheets-Sheet 2
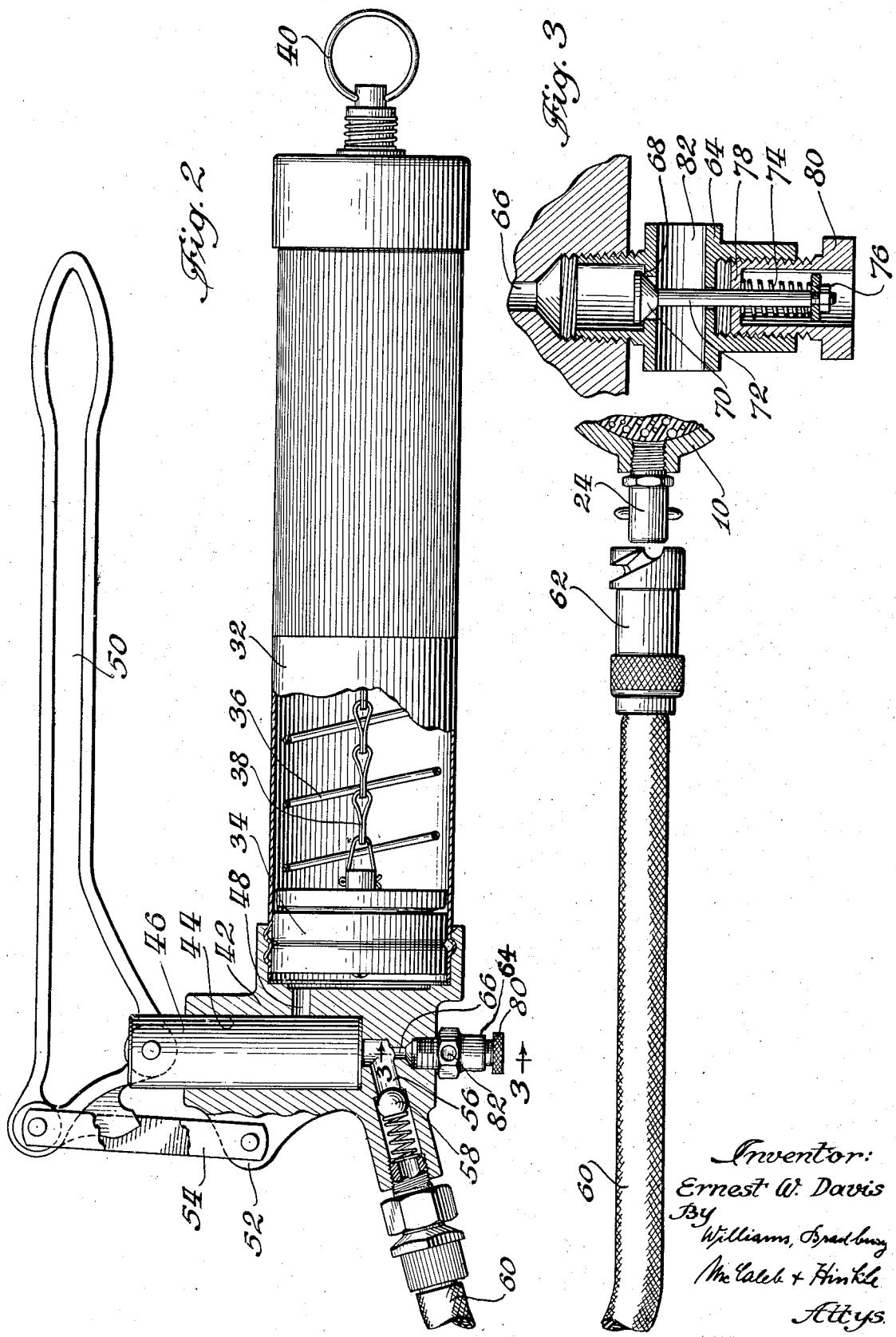
Inventor:
Ernest W. Davis
By
Williams, Bradbury,
McCaleb & Hinkle
Attys.

Patented Feb. 11, 1936

2,030,504

UNITED STATES PATENT OFFICE 2,030,504

METHOD OF LUBRICATION AND APPARATUS THEREFOR

Ernest W. Davis, Oak Park, Ill., assignor to Stewart-Warner Corporation, Chicago, Ill., a corporation of Virginia Application February 7, 1934, Serial No. 710,053

8 Claims. (Cl. 184—1)

My invention relates generally to an improved method for the lubrication of antifriction bearings such as ball bearings and roller bearings, particularly the larger bearings of this type.

Difficulty has been experienced in the past in the proper lubrication of ball bearings and roller bearings due to the fact that the housings enclosing the bearings have been completely filled with lubricant. When a bearing of this type is thus completely filled with grease, the grease, especially if it has considerable body, will become overheated and as a result the oil may separate from the soap of the grease, destroying to a great extent its lubricating properties. This difficulty is particularly prevalent where grease is forced into antifriction bearings by means of a pressure grease gun, where the tendency of the person applying the lubricant will be to force as much grease as possible into the bearing. The bearing should, in fact, be only partially filled with grease. It is, however, extremely difficult for the workman to determine the extent to which he has filled the bearing with grease.

By the method of my invention the bearing is lubricated by supplying to it a mixture of air and grease in predetermined proportions. Thus, no matter how much of the mixture is forced into the bearing, the bearing will never be completely filled with lubricant and there will always be sufficient air present to prevent undue friction in the lubricant itself.

In the lubrication of bearings by the method of my invention, I employ a novel form of lubricant compressor which is arranged to supply both air and grease to the bearings.

It is therefore an object of my invention to provide an improved method for the lubrication of antifriction bearings.

A further object is to provide an improved lubricant compressor for the lubrication of antifriction bearings.

Other objects will appear from the following description, reference being had to the accompanying drawings, in which Figure 1 is a central vertical sectional view of a roller bearing;

Figure 2 is an elevational view of an improved form of lubricant compressor, the pumping mechanism thereof being shown in central vertical section;

Figure 3 is a sectional view taken on the plane of line 3—3 of Figure 2;

Figure 4 is a sectional view of a modified form of lubricant compressor; and

Figure 5 is a central vertical sectional view of a coupler used with the compressor shown in Figure 4.

The bearing shown in Figure 1 comprises a housing 10 for a pair of roller bearing assemblies 12, 14, the space between which forms a cavity 16 to receive lubricant. A shaft 18 is journalled in the roller bearing assembly 12, 14. Sealing rings 20 and 22, threaded in the housing 10, prevent leakage of lubricant from the bearing. A lubricant receiving fitting 24 is threaded in the housing 10 and adapted to supply lubricant to the cavity 16. An annular space 26, formed between the roller bearing assembly 14 and the sealing ring 20, communicates with the atmosphere through an oil cup fitting 28 which is normally closed by a spring-pressed dust cap 30.

In bearings of this type the lubricant is supplied through the fitting 24, and any surplus may escape through the vent fitting 28. In bearings of this type, however, the attendant having charge of the lubrication thereof, will, unless he is extremely careful, completely fill both the cavities 16 and 26 with grease, and the rotating shaft, together with the bearing parts turning therewith, will churn the lubricant, in many instances causing sufficient internal friction in the lubricant that a substantial increase in temperature will result. The fact that the bearing is warm will usually cause the attendant to supply additional grease, whereas, in fact, the proper remedy would be the removal of some of the grease already in the bearing. If the bearing does not happen to be supplied with an atmospheric vent, the attendant may endeavor to force additional lubricant into the bearing under the high pressure which may be developed by means of a grease gun, whereupon the lubricant will be forced past the sealing rings. If the bearing is that of an electric motor, the oil and grease forced from the bearing may materially interfere with the proper operation of the commutator. In the food and textile industries likewise, the forcing of oil or grease from the bearing is particularly objectionable.

According to the method of my invention, the attendant will supply a mixture of air and grease in predetermined relative proportions to the bearing, thus insuring that no more than a predetermined quantity of lubricant will be forced into the cavities of the bearing. Any excess of the mixture supplied to the bearing may readily escape through the vent fitting 28.

The preferred form of lubricant compressor used to accomplish this result is illustrated in Figures 2 and 3, and comprises a reservoir barrel 32 for grease having a follower 34 slidable therein and normally pressed forwardly to discharge lubricant from the barrel by a compression coil spring 36. One end of a chain 38 is attached to the follower and the other end secured to a ring 40 by which the follower may be retracted when filling the compressor with lubricant.

The barrel 32 is threaded in a head casting 42 which is provided with a transverse cylinder bore 44 in which a plunger 46 is reciprocable. The bore 44 communicates with the barrel 32 through an inlet passageway 48. A handle 50 is pivotally connected to the plunger 46 and is connected to a boss 52 formed on the head casting 42 by a pair of links 54.

The lower end of the cylinder bore 44 communicates with an outlet passageway 56 which is normally closed by a spring-pressed ball check valve 58. A discharge conduit 60 is suitably connected to the discharge passageway 56 and at its extremity carries a coupler 62 having means for making a quick detachable connection with a lubricant receiving fitting 24 attached to the bearing housing 10 to be lubricated. An air inlet fitting 64 is threaded in the head casting 42 and communicates with the discharge passageway 56 through a port 66.

The fitting 64 (Figure 3) has a valve seat 68 formed therein for a valve 70 which has a stem 72. A spring 74 is compressed between a washer 76 secured to the end of the stem 72 and the bottom wall 78 of a bushing 80. When the valve 70 is raised from its seat, atmospheric air may flow freely through a passageway 82 formed in the fitting, into the discharge passageway 56 of the lubricant compressor. The bushing 80 may be adjustably positioned so as to permit the valve 70 to unseat upon a pressure difference of a few pounds per square inch.

When the lubricant compressor shown in Figures 2 and 3 is operated, a partial vacuum is formed during the initial portion of the up stroke of the plunger 46. Assuming that a vacuum of approximately 12 pounds per square inch is formed in the discharge passageway 56 upon the retractile stroke of the plunger 46, and that the bushing 80 is so adjusted that the valve 70 may open upon a pressure difference of 6 pounds per square inch, it will be apparent that as the plunger is retracted the partial vacuum formed will cause a certain amount of air to be drawn into the cylinder bore 44 past the valve 70. When the plunger 46 uncovers the inlet port 48, the spring-pressed follower will force grease into the cylinder bore 44, partially compressing the air contained therein. Upon the discharge stroke of the plunger 46, the grease and air will be forced past the check valve 58 and into the housing 10 of the bearing to be lubricated.

In the given example approximately half air and half grease will be forced into the bearing. If a greater proportion of air is desired, the tension of the spring 74 may be relieved so that the valve 70 will open upon a lesser pressure difference, whereupon a greater amount of air will be sucked into the cylinder bore 44 upon the retractile stroke of the plunger and discharged upon the downward stroke of the plunger. As previously stated, the attendant will force the mixture of air and grease into the bearing until the mixture commences flowing from the vent fitting 28.

In the compressor construction shown in Figure 4, the head casting 90 is provided with two cylindrical bores 92 and 94, the former having a grease discharge plunger 96 reciprocable therein and the latter being provided with an air discharge plunger 98. The plunger 98 has a cup leather 100 suitably secured thereto. The plunger 92 is pivotally connected to a lever handle 102 while the plunger 98 is connected to said handle by a pin and slot connection. The lever 102 is connected to the head by means of a pair of pivoted links 104. A reservoir barrel 106, provided with a follower 108, is adapted to supply lubricant to the cylinder 92 in the manner previously described with reference to the compressor shown in Figures 2 and 3.

The plunger 98 has a groove 110 extending substantially the length thereof to form a passageway to admit air into the cylinder 94, the cup leather 100 acting as an inlet check valve. A spring-pressed ball check valve 112 forms the outlet valve for the air pump while a spring-pressed ball check valve 114 forms the outlet valve for the lubricant pumping mechanism. Flexible conduits 116 and 118 connect the air pumping mechanism and the lubricant pumping mechanism, respectively, to a coupler 120 shown in detail in Figure 5. This coupler is provided with the usual bayonet slots 122 for making a detachable connection with the lubricant receiving pin fitting 24 and has the usual spring-pressed sealing washer 124 for sealing against the end of the fitting. The body of the coupler 120 has a sidewardly extending boss 126 having a passageway 128 formed therein and leading into the bore of the coupling. The hose 116 is suitably connected to the passageway 128.

Upon reciprocating the lever handle 102, it will be apparent that both the grease pumping mechanism and the air pumping mechanism will be simultaneously operated to force predetermined relative proportions of air and grease into the bearing to which the coupler 120 may be connected. The displacement of the air pumping plunger 98 is such relative to that of the lubricant pumping plunger 96, that air and grease will be supplied in the desired proportion.

Having thus described my invention, what I claim as new and desire to secure by Letters Patent of the United States is:

1. The method of lubricating antifriction bearings which comprises simultaneously forcing a mixture of grease and a large proportion of air into the bearing.

2. The method of lubricating antifriction bearings which comprises supplying the bearing with grease containing a predetermined proportion of a gas.

3. A lubricant compressor, comprising a grease reservoir, means for forcing grease from said reservoir into a bearing to be lubricated, and means to mix a gas with the grease as it is fed to the bearing.

4. A lubricant compressor comprising a grease pumping mechanism, and means to mix a predetermined quantity of a gas with the grease pumped thereby.

5. In combination, a grease pump comprising a cylinder, a piston reciprocable therein and operable to discharge grease therefrom, a check valve for admitting air to said cylinder, and a relatively weak spring normally holding said valve closed but openable upon a pressure difference of the order of five pounds per square inch to permit admission of a regulated quantity of air to said cylinder upon the suction stroke of said piston, whereby the admitted air may mix with the grease in said cylinder and be discharged therewith from the pump cylinder.

6. In combination, a grease reservoir, a lubricant pumping mechanism receiving lubricant from said reservoir, an air pump, means for mixing and conducting the grease discharged by said pump mechanism and the discharge of said air pump to a bearing to be lubricated, and means for operating said mechanism and said pump in unison.

7. In combination, a lubricant reservoir, a lubricant pump receiving lubricant from said reservoir and comprising a cylinder and a reciprocable piston, a passageway from the atmosphere to said cylinder, and a resiliently held check valve in said passageway, said check valve opening under low differential pressure to admit atmospheric air to said cylinder during the suction stroke of said piston.

8. Apparatus for the lubrication of antifriction bearings comprising a reservoir for plastic lubricant, means for discharging the plastic lubricant from said reservoir to a bearing, and means for adding a predetermined quantity of air to and mixing it with the plastic lubricant discharged by said means, whereby the possibility of completely filling the spaces in the antifriction bearing with the plastic lubricant will be eliminated.

ERNEST W. DAVIS.